US008683913B2

(12) United States Patent
Sikorsky et al.

(10) Patent No.: US 8,683,913 B2
(45) Date of Patent: Apr. 1, 2014

(54) PISTON FOR AN INTERNAL COMBUSTION ENGINE

(75) Inventors: Willi Sikorsky, Neckarsulm (DE); Ralf Buschbeck, Mockmuhl (DE); Albert Haberl, Bad Friedrichshall (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 267 days.

(21) Appl. No.: 12/065,799

(22) PCT Filed: Aug. 2, 2006

(86) PCT No.: PCT/EP2006/007638
§ 371 (c)(1),
(2), (4) Date: Jun. 13, 2008

(87) PCT Pub. No.: WO2007/028466
PCT Pub. Date: Mar. 15, 2007

(65) Prior Publication Data

US 2008/0245229 A1 Oct. 9, 2008

(30) Foreign Application Priority Data

Sep. 8, 2005 (DE) ........................ 10 2005 042 857

(51) Int. Cl.
*F16J 1/04* (2006.01)

(52) U.S. Cl.
USPC ........................................................ 92/208

(58) Field of Classification Search
USPC .................................. 92/186, 208, 209, 210
See application file for complete search history.

(56) References Cited

U.S. PATENT DOCUMENTS

| | | | | |
|---|---|---|---|---|
| 3,626,815 A * | 12/1971 | Fingeroot et al. | ............... | 92/210 |
| 3,877,351 A | 4/1975 | Barfiss et al. | | |
| 4,651,631 A | 3/1987 | Avezou et al. | | |
| 5,076,225 A * | 12/1991 | Tokoro et al. | .................. | 92/208 |
| 5,119,777 A * | 6/1992 | Mielke et al. | ............. | 123/193.6 |

(Continued)

FOREIGN PATENT DOCUMENTS

| | | |
|---|---|---|
| DE | 901104 | 1/1954 |
| DE | 2537182 | 3/1977 |

(Continued)

OTHER PUBLICATIONS

Co-pending related U.S. Appl. No. 12/066,890, filed Apr. 21, 2008, entitled "Piston, Especially Cooling Channel Piston, of an Internal Combustion Engine, Comprising Three Friction Welded Zones" assigned to the same assignee as the subject application.

(Continued)

*Primary Examiner* — Michael Leslie
(74) *Attorney, Agent, or Firm* — Young, Basile, Hanlon & MacFarlane P.C.

(57) ABSTRACT

A piston includes a piston head, a ring zone and a piston skirt having load-bearing skirt wall sections and rear connecting walls which interconnect the skirt wall sections and piston-pin bosses which run on a boss axis that is set back from a piston axis and penetrate the connecting walls. The peripheral lower edge of the connecting walls is convex in relation to an axis and the upper edge of said connecting walls, preferably below the ring zone, is concave in relation to an axis perpendicular to a piston-pin axis. The piston is equipped with a reinforced section in the vicinity of the piston head running radially behind the ring zone.

10 Claims, 3 Drawing Sheets

(56) References Cited

U.S. PATENT DOCUMENTS

| | | | | | |
|---|---|---|---|---|---|
| 5,505,171 | A | * | 4/1996 | Gazzard | 92/208 |
| 5,601,010 | A | * | 2/1997 | Sawada et al. | 92/208 |
| 5,671,710 | A | * | 9/1997 | Sasaki | 123/193.6 |
| 5,979,298 | A | * | 11/1999 | Whitacre | 92/211 |
| 6,152,017 | A | * | 11/2000 | Harrer et al. | 92/208 |
| 6,155,157 | A | | 12/2000 | Jarrett et al. | |
| 2001/0029840 | A1 | | 10/2001 | Gaiser et al. | |
| 2003/0140885 | A1 | | 7/2003 | Grassi | |

FOREIGN PATENT DOCUMENTS

| | | |
|---|---|---|
| DE | 102004038465 | 2/2006 |
| DE | 10145589 | 6/2008 |
| EP | 0877160 | 11/1996 |
| EP | 1084793 | 3/2001 |
| JP | 52031213 | 3/1977 |
| JP | 60166158 | 8/1985 |
| JP | 2003025076 | 1/2003 |
| SU | 1518562 | 10/1989 |
| WO | WO 2005046929 A1 * | 5/2005 |

OTHER PUBLICATIONS

Co-pending related U.S. Appl. No. 12/066,886, filed Mar. 14, 2008, entitled "Piston, Especially Coling Channel Piston, Comprising Three Friction-Welded Zones" assigned to the same assignee as the subject application.

International Search Report dated Feb. 11, 2006 for PCT/EP2006/007638.

English Translation of the International Preliminary Report on Patentability dated Aug. 2, 2006 for PCT/EP2006/007638.

International Search Report dated Apr. 5, 2008 for PCT/EP2005/010063.

International Search Report dated Jun. 26, 2006 for PCT/EP2005/010061.

* cited by examiner

PISTON FOR AN INTERNAL COMBUSTION ENGINE

BACKGROUND

The invention relates to a piston for an internal combustion engine.

A piston for internal combustion engines is known from EP 0 902 180 A2. In this piston, the bosses are set back in the axial direction of the piston-pin bolt such that the outer boss measurement is 60 to 65% or less of the piston diameter. The boss outer surfaces which interconnect the two running surfaces have a straight (linear) shape when viewed over the height of the running surfaces. In this piston the boss outer surfaces (also called box walls) are not categorically planar but also curved in cross-section both parallel as well as perpendicular to the piston axis. However, the direction of the curvature of the surface in cross-section perpendicular to the piston axis is always constant for the entire surface of the box wall. With the distance between the box walls diminishing in the upward direction (towards the piston head), the result is decreasing width for the load-bearing running surface in the upward direction. The disadvantage is that when the distance of the box walls from each other widens, the potential for weight savings by undercutting the ring zone in the direction of the piston-pin bore cannot be fully utilized. The support for the piston head provided by the box walls is not optimal because of the reduction in piston head tensile strength. When the distance of the box walls narrows in an upward direction (towards the piston head), skirt area which is needed to keep the piston straight and to provide protection against seizing is lost at the skirt upper edge. In addition, because of the lack of support for the ring zone, high stresses result in the transitional area between the piston skirt and the casting around the ring zone.

Connecting walls are also known in pistons which are configured as planes parallel to each other or curved surfaces with only one radius of curvature and only one direction of curvature.

A piston, such as is known from DE 101 45 589 A1, offers an improvement. Said piston has a free casting (undercut) in the piston head which extends radially and peripherally behind the ring zone. This free casting has the advantage of reducing weight but at the same time the disadvantage is that the vicinity of the piston head is weakened as a result.

It would be desirable to provide a piston which eliminates the disadvantages described.

SUMMARY

With different piston designs and concerning the shape of the skirt wall sections and their connecting walls (the advantages of which are described in DE 101 45 589 A1), a reinforced section is provided in the vicinity of the piston head running radially behind the ring zone. This reinforced section has the advantage that the piston head area there is reinforced, where the free casting is also located to counteract the stresses resulting from the combustion temperatures and pressures during operation of the piston in the cylinder of an internal combustion engine. Since the free casting (undercut) is located in this area, this reinforcement is of particular advantage since the skirt below the ring zone is disposed to be free-hanging and cannot contribute to the reinforced section (support).

In one aspect, the reinforced section is configured as an insert which is introduced in the casting die before the casting of a piston blank, secured there and surrounded with metal melt. The insert is of the same material as, or a different material than, the material from which the piston blank is cast. Weight savings from the free casting on the one hand and reinforcement from the insert on the other hand can be optimally balanced against each other.

In another aspect, the insert is configured to be one-piece or multi-piece, or an annular one-piece. The multi-piece design has the advantage that the insert can be disposed at the locations behind the ring zone and approximately at the height of the free casting at which special reinforcement should be provided. The insert can be configured annular and in one piece so that it can be handled very easily when inserted into the casting die. In addition, particularly good, consistent reinforcement, above all radial support, is given in the vicinity of the ring zone.

In another aspect, the insert has an outer diameter prior to its insertion into the casting die which is smaller than, or the same as, the inner diameter of the casting die at the location where the insert is secured. The inner diameter of the insert is greater than, or the same as, the outer diameter of the free casting. A space can be provided between the insert and the free casting for the purpose of reinforcement and to avoid problems during the casting. This space should be selected such that, when filling the metal melt into the casting die, sufficient metal melt can distribute itself between the insert and the free casting and gaps are avoided. The free casting (undercut) is formed by a correspondingly shaped molded part (slider) of the casting die which, depending on the shape of the free casting, is extracted perpendicularly, at an angle or at a right angle to the piston stroke axis after the metal melt has hardened. Overall, the insert is shaped such that it acts to reinforce the piston head and, after the piston is manufactured (casting the piston blank which is finish machined), appears at the radial surface of the piston in the vicinity of the ring zone. The axial height of the insert is selected such that it extends above and below at least one ring groove, such as above and below the topmost ring groove, or it may also extend over several ring grooves. It is possible that the insert has a groove to accommodate an oil ring before casting, or the groove (ring groove) is introduced at the time when the piston blank is finish machined.

In another aspect the insert has a single- or multi-piece cooling channel plate formed onto the insert which creates a cooling channel. This allows the piston head to be cooled by a cooling medium circulating in the cooling channel, specifically engine oil, in order to cope with the high stress demands on the piston during operation.

In another aspect, the lower edge of the ring zone in the vicinity of the connecting walls projects beyond the walls (projection) and is at least partially hollowed out there. As a result of this projection, as well as the projection being hollowing out, a further weight reduction is achieved in an area which is not critical to the strength of the piston. The area that is hollowed out is oriented specifically according to the alignment of the piston-pin boss and of the transitional area of the piston head into the piston skirts.

BRIEF DESCRIPTION OF THE DRAWING

An aspect of a piston, to which the piston is not, however, restricted is described in the following description and using the Figures in which.

DETAILED DESCRIPTION

Figure 1:
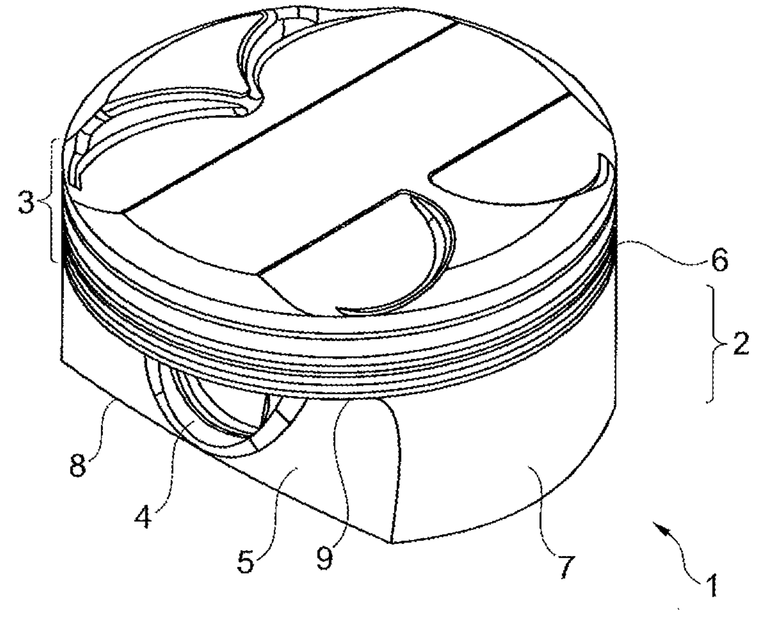
FIG. 1 shows a three-dimensional view of a piston.

FIG. 1 shows a piston 1 which is specifically a lightweight piston, in particular, for an internal combustion engine. This piston 1 has a piston skirt 2 and a cylindrically shaped piston head 3 which is specifically adapted to the type of internal combustion engine (diesel or Otto-cycle internal combustion engine). The design of the piston head, which can be of any type, is not important.

There are, in addition, piston-pin bosses 4 which run on a boss axis that is set back from a piston axis and are part of the piston skirt 2. The piston-pin bosses 4 are located in two rear connecting walls 5 which interconnect two oppositely lying skirt sections 7. Further, a ring zone 6 is provided in the piston head 3 with a topmost ring groove 16. The lower edge of the connecting wall 5 is identified with the reference numeral 8, and the lower edge of the piston head 3 or the ring zone 6 with the reference numeral 9. The design of the piston 1 is such that the curvature functions, their relative offset to each other along the piston-pin axis and the type of their interconnection along the longitudinal axis of the piston are selected such that surfaces of the skirt wall sections 7 result with a constant skirt width or a skirt width tapering upward towards or downwards along the longitudinal axis of the piston.

Figure 2:
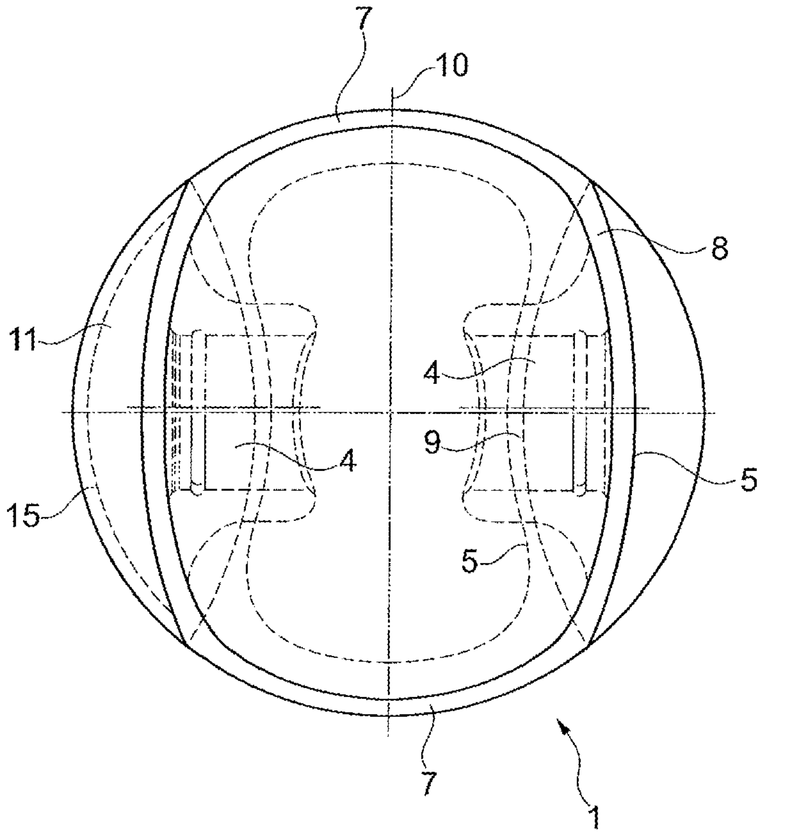
FIG. 2 shows a piston in a view from below into the inner area of the piston.

FIG. 2 shows the view of the piston 1 seen from below into the inner area of the piston 1. Here it can be seen that the connecting walls 5 have a convex radius of curvature in their peripheral lower edge 6 in relation to an axis 10 (perpendicular to the piston-pin axis) (shown as a continuous line in FIG. 2). In the vicinity of the lower edge 9 of the ring zone 6, the connecting walls 5 have a concave radius of curvature in relation to the axis 10 (shown as a broken line in FIG. 2).

A projection (ring zone projection) of the lower edge of the ring zone beyond the connecting walls 5 is identified with the reference numeral 11, where this area is hollowed out at least partially to realize a further weight savings. This hollowing out of the projection 11 can also extend into the areas in which the skirt wall sections 7 are located and, if necessary into the inner area of the ring zone 6, until just before the end of the piston head 3. The hollowing out can be performed as a free casting 12 (refer to FIG. 3) behind the ring zone 6 in the surface of the projection 11 and at such places which do not contribute, or contribute only marginally, to the strength of the piston 1, specifically of the piston head 3 (where reference numeral 13 denotes the piston axis, and reference numeral 14 denotes the piston-pin axis).

Figure 3:
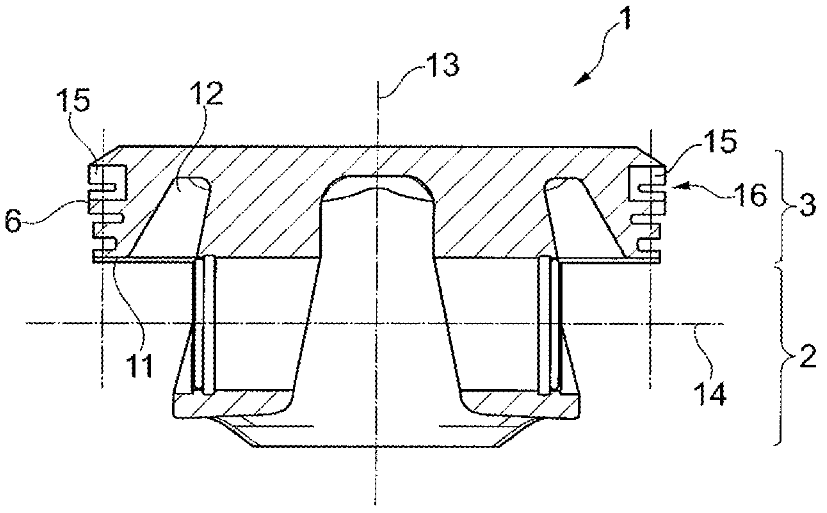
FIG. 3 shows a piston in section along the piston axis.

Furthermore, a reinforced section or reinforcement 15, shown in FIGS. 2 and 3, is provided running radially behind the ring zone in the vicinity of the piston head 3 which serves to reinforce the piston head 3. By example, the reinforcement 15 is disposed behind a topmost ring groove 16. Thus, through the combination of free casting 12 and the reinforcement 15, weight is saved on the one hand, and strength is increased on the other. This is particularly the case when the weight constituting the volume of the free casting 12 is greater than the weight of the reinforcement, that is, of the single- or multi-piece insert. This can be achieved, for example, by the material of the insert having a lower specific density than that of the surrounding piston material. As an alternative, or supplemental thereto, this effect can also be achieved with the same materials using different volumes (i.e. the volume of the insert is less than the volume of the free casting).

What is claimed is:

1. A piston having a piston head, a ring zone and a skirt, consisting of load-bearing skirt wall sections and rear connecting walls which interconnect the skirt wall sections and piston-pin bosses which run on a boss axis set back from a piston axis and which penetrate the rear connecting walls in the vicinity of their peripheral lower edge convexly to an axis and are configured concave in relation to the axis in the area of their upper edge below the ring zone; comprising:

a circumferential, free cast, hollowed out area formed in a projection of the ring zone beyond the rear connecting walls radially inward of the ring zone;

a reinforced section configured as an insert provided in the vicinity of the piston head running radially between a radially outward extending, open-ended groove in the ring zone configured to receive a piston ring and the hollowed out area; wherein a weight of a volume of piston material represented by the free cast hollowed out area is greater than a weight of the insert the insert including at least one body; and the insert fixed in place by solidified metal melt of the piston.

2. The piston of claim 1 wherein the reinforced section is configured as an insert introduced into a casting die before the casting of a piston blank, anchored there and surrounded with metal melt.

3. The piston of claim 2 wherein the insert is configured to be one of a single-piece, multi-piece, and an annular single-piece.

4. The piston of claim 2 wherein the insert has an outside diameter before its insertion into the casting die which is one of smaller than, and the same as the inside diameter of the casting die at the location where the insert is anchored and the inside diameter of the insert is one of greater than and the same as the outer diameter of the free casting.

5. The piston of claim 2 wherein the insert appears at the radial surface of the piston in the vicinity of the ring zone, and the axial height of the insert is selected such that it extends above and below at least one ring groove.

6. The piston of claim 1 further comprising:

a radially outward extending, open-ended groove carried in the body and configured to receive a piston ring.

7. The piston of claim 1 wherein:

a specific density of the material forming the insert is lower than a specific density of the piston material.

8. The piston of claim 1 wherein:

the insert and the piston are formed of the same material; and a volume of the insert is less than a volume of the piston material represented by the free cast hollowed out area.

9. A piston having a piston head, a ring zone and a piston skirt, consisting of load-bearing piston skirt sections and rear connecting walls which interconnect the piston skirt sections, and piston-pin bosses which run on a boss axis set back from a piston axis and which penetrate the rear connecting walls, where the rear connecting walls are configured convex in relation to an axis in the vicinity of a peripheral lower edge of the rear connecting walls and straight in the area of an upper edge below the ring zone; comprising:

a circumferential, free cast, hollowed out area formed in a projection of the ring zone beyond the rear connecting walls radially inward of the ring zone;

a reinforced section configured as an insert provided in the vicinity of the piston head running radially between a radially outward extending, open-ended groove in the ring zone configured to receive a piston ring and the hollowed out area; wherein a weight of a volume of piston material represented by the free cast hollowed out area is greater than a weight of the insert the insert including at least one body; and the insert fixed in place by solidified metal melt of the piston.

10. A piston having a piston head, a ring zone and a piston skirt, consisting of load-bearing piston skirt sections and rear connecting walls which interconnect the piston skirt sections, and piston-pin bosses which run on a boss axis set back from a piston axis and which penetrate the rear connecting walls, where the rear connecting walls are configured straight in the area of their peripheral lower edge and concave to the piston axis in the area of an upper edge below the ring zone, comprising:

a circumferential, free cast, hollowed out area formed in a projection of the ring zone beyond the rear connecting walls radially inward of the ring zone;

a reinforced section configured as an insert provided in the vicinity of the piston head running radially between a radially outward extending, open-ended groove in the ring zone configured to receive a piston ring and the hollowed out area; wherein a weight of a volume of piston material represented by the free cast hollowed out area is greater than a weight of the insert the insert including at least one body; and the insert fixed in place by solidified metal melt of the piston.

* * * * *